(12) United States Patent
Nakayoshi et al.

(10) Patent No.: US 7,796,231 B2
(45) Date of Patent: Sep. 14, 2010

(54) LIQUID CRYSTAL DISPLAY DEVICE WITH SEALING MATERIAL HAVING SPACER THEREIN

(75) Inventors: Yoshiaki Nakayoshi, Ooamishirasato (JP); Nagatoshi Kurahashi, Mobara (JP); Kazuhiko Yanagawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 12/129,829

(22) Filed: May 30, 2008

(65) Prior Publication Data

US 2008/0231792 A1  Sep. 25, 2008

Related U.S. Application Data

(62) Division of application No. 11/240,485, filed on Oct. 3, 2005, now Pat. No. 7,388,643, which is a division of application No. 10/241,481, filed on Sep. 12, 2002, now Pat. No. 7,068,341.

(30) Foreign Application Priority Data

Oct. 11, 2001   (JP) .............................. 2001-313751

(51) Int. Cl.
*G02F 1/1339*   (2006.01)
*G02F 1/1333*   (2006.01)
*G02F 1/136*    (2006.01)

(52) U.S. Cl. ...................... 349/153; 349/190; 349/110; 349/44; 349/155

(58) Field of Classification Search ................. 349/153, 349/190, 44, 110, 155
See application file for complete search history.

(56) References Cited

U.S. PATENT DOCUMENTS

| | | | | |
|---|---|---|---|---|
| 4,106,860 A | * | 8/1978 | Kaufmann ................ | 349/154 |
| 4,965,134 A | * | 10/1990 | Ahne et al. ............... | 428/411.1 |
| 5,503,932 A | * | 4/1996 | Sakai et al. ............... | 428/404 |
| 5,858,482 A | * | 1/1999 | Ishiwata et al. ........... | 428/1.53 |
| 5,936,695 A | * | 8/1999 | Hida et al. ................ | 349/153 |
| 6,118,509 A | | 9/2000 | Miyake | |
| 6,259,505 B1 | | 7/2001 | Makino | |
| 6,396,470 B1 | * | 5/2002 | Zhang et al. .............. | 345/87 |
| 6,473,148 B1 | | 10/2002 | Suh | |

(Continued)

FOREIGN PATENT DOCUMENTS

JP   1-239528   9/1989

(Continued)

*Primary Examiner*—Mike Qi
(74) *Attorney, Agent, or Firm*—Antonelli, Terry, Stout & Kraus, LLP.

(57) ABSTRACT

A liquid crystal display device has a pair of substrates disposed in opposition to one another with a liquid crystal interposed therebetween, active elements formed on one of the pair of substrates, an organic film layer formed to cover the active elements, a light-shielding film formed on another of the pair of substrates, and a sealing material which sticks the pair of substrates together. In the liquid crystal display device, the sealing material is formed integrally along the entire periphery of a display screen, and one of the light-shielding layer and the organic film layer is formed to be extended beyond an area where the sealing material is formed, and the other of the light-shielding layer and organic film layer is formed inside the area where the sealing material is formed.

4 Claims, 10 Drawing Sheets

U.S. PATENT DOCUMENTS

| | | | |
|---|---|---|---|
| 6,693,683 B2 * | 2/2004 | Ishitaka | 349/65 |
| 7,253,866 B2 * | 8/2007 | Moon et al. | 349/153 |
| 2002/0054257 A1 * | 5/2002 | Tanada et al. | 349/113 |

FOREIGN PATENT DOCUMENTS

| | | |
|---|---|---|
| JP | 06-175141 | 6/1994 |
| JP | 7-98459 | 4/1995 |
| JP | 8-29792 | 2/1996 |
| JP | 9-90383 | 4/1997 |
| JP | 9-113919 | 5/1997 |
| JP | 10-123571 | 5/1998 |
| JP | 10-253953 | 9/1998 |
| JP | 2000-187229 | 7/2000 |
| JP | 2000-231112 | 8/2000 |
| WO | WO99/39239 | 8/1999 |

* cited by examiner

LIQUID CRYSTAL DISPLAY DEVICE WITH SEALING MATERIAL HAVING SPACER THEREIN

CROSS REFERENCE TO RELATED APPLICATION

This is a divisional application of U.S. application Ser. No. 11/240,485, filed Oct. 3, 2005, now U.S. Pat. No. 7,388,643 which is a divisional application of U.S. application Ser. No. 10/241,481, filed Sep. 12, 2002, now U.S. Pat. No. 7,068,341, the contents of which are incorporated herein by reference.

BACKGROUND OF THE INVENTION

The present invention relates to a liquid crystal display device; and, more particularly, the invention relates to improvements in the construction of the liquid crystal injecting port and the vicinity thereof in a liquid crystal display device.

A liquid crystal display device includes a liquid crystal display panel which is made up of a pair of substrates disposed in opposition to each other with a liquid crystal material interposed therebetween, and this panel is provided with a multiplicity of pixels arranged in the region of the liquid crystal material. The pixels are each provided with means for independently applying electric fields to the liquid crystal material in the vicinity of the respective pixels.

The substrates are secured to each other by a sealing material, which also serves to seal the space between the substrate in which the liquid crystal is held. A liquid crystal injecting port is formed ma portion of the sealing material, and after the liquid crystal material has been injected through the liquid crystal injecting port, the liquid crystal injecting port is sealed by a liquid crystal sealing material. The liquid crystal sealing material which is typically used is a UV (ultraviolet) resin, and the UV resin is cured by irradiation with UV light after it is applied.

Incidentally, a known type of liquid crystal display device that is formed in the above-described manner has the following construction. Thin film transistors are respectively formed in individual pixel areas on a liquid-crystal-side surface of one substrate, and a protective film made of an organic material layer, such as a resin layer, for preventing direct contact between the thin film transistors and liquid crystal, is formed on the same liquid-crystal-side surface; while, a black matrix for separating the pixel areas from one another is formed on a liquid-crystal-side surface of the other substrate.

SUMMARY OF THE INVENTION

However, it should be pointed out that the liquid crystal display device having the above-described construction has an inherent problem in that the liquid crystal sealing material is not fully cured and partly elutes in the liquid crystal as a contaminant, so that a display irregularity can be observed in the liquid crystal display region at the periphery of the liquid crystal injecting port.

From an investigation into the problem, the following discovery has been made. Among respective substrates of the liquid crystal display device, irradiation with UV light from the substrate on which the black matrix is formed is blocked by the black matrix, and the curing of the liquid crystal sealing material is largely effected by irradiation with UV light received through the other substrate.

However, since a protective film having a comparatively large thickness is formed on the liquid-crystal-side surface of the other substrate, as described previously, the protective film precludes the liquid crystal sealing material from being fully irradiated with UV light, so that the liquid crystal sealing material remains in an uncured state.

The invention has been made in view of the above-described problem, and the object of the present invention is to provide a liquid crystal display device that is capable of preventing insufficient curing of a liquid crystal sealing material, which causes display irregularity.

Representative aspects of the invention disclosed in the present application will be described below in brief.

(1) A liquid crystal display device according to the invention includes, for example, substrates disposed in opposition to one another with a liquid crystal material interposed therebetween, a black matrix formed on a liquid-crystal-side surface of one of the substrates, an organic material layer formed on a liquid-crystal-side surface of another of the substrates, and a substrate sealing material formed to fix the substrates to one another and seal the liquid crystal material. The substrate sealing material has a portion in which a liquid crystal injecting port is provided, which is sealed by a liquid crystal sealing material, and the organic material layer is formed to avoid a location where the liquid crystal sealing material is provided, as well as the vicinity of such location.

(2) A liquid crystal display device according to the invention includes, for example, substrates disposed in opposition to one another with a liquid crystal material interposed therebetween, a black matrix formed on a liquid-crystal-side surface of one of the substrates, an organic material layer formed on a liquid-crystal-side surface of another of the substrates, and a substrate sealing material formed to fix the substrates to one another and seal the liquid crystal material. The substrate sealing material has a portion in which a liquid crystal injecting port is provided, which is sealed by a liquid crystal sealing material, and the black matrix is formed to extend to a location where the liquid crystal sealing material is formed, while the organic material layer is formed to extend so as not to reach the location where the liquid crystal sealing material is formed.

(3) A liquid crystal display device according to the invention includes, for example, substrates disposed in opposition to one another with a liquid crystal material interposed therebetween, a black matrix formed on a liquid-crystal-side surface of one of the substrates, an organic material layer formed on a liquid-crystal-side surface of another of the substrates, and a substrate sealing material formed to fix the substrates to one another and seal the liquid crystal material. The substrate sealing material has a portion in which a liquid crystal injecting port is provided, which is sealed by a liquid crystal sealing material, and the black matrix is formed to extend to a location where the liquid crystal sealing material is formed, while the organic material layer is formed to extend beyond the sealing material in a pattern which avoids the location where the liquid crystal sealing material is formed.

(4) A liquid crystal display device according to the invention includes, for example, substrates disposed in opposition to one another with a liquid crystal material interposed therebetween, a black matrix formed on a liquid-crystal-side surface of one of the substrates, an organic material layer formed on a liquid-crystal-side surface of another of the substrates, and a substrate sealing material formed to fix the substrates to one another and seal the liquid crystal material. The substrate sealing material has a portion in which a liquid crystal injecting port is provided, which is sealed by a liquid crystal sealing material, and the black matrix is formed to extend to a location where the liquid crystal sealing material is formed. The organic material layer is formed to extend beyond the sealing material, and a portion where the organic material layer is formed and a portion where the organic material layer is not formed are present in the location where the liquid crystal sealing material is formed.

(5) A liquid crystal display device according to the invention includes, for example, substrates disposed in opposition to one another with a liquid crystal material interposed therebetween, a black matrix formed on a liquid-crystal-side surface of one of the substrates, an organic material layer formed on a liquid-crystal-side surface of another of the substrates, a plurality of column-shaped spacers dispersed on the liquid-crystal-side surface of the one of the substrates, and a substrate sealing material formed to fix the substrates to one another and seal the liquid crystal material. The substrate sealing material has a portion in which a liquid crystal injecting port is provided, which is sealed by a liquid crystal sealing material, and the black matrix is formed to extend to a location where the liquid crystal sealing material is formed. The organic material layer is formed to extend beyond the sealing material, and a portion where the organic material layer is formed and a portion where the organic material layer is not formed are present in the location where the liquid crystal sealing material is formed. The column-shaped spacers are disposed in the portion where the organic material layer is formed, at the location where the liquid crystal sealing material is formed.

(6) In the manufacture of a liquid crystal display device according to the invention, for example, a liquid crystal material is dropped and charged into a region defined by a frame-shaped sealing material formed on one substrate, and, after another substrate has been disposed in opposition to the one substrate, the sealing material is cured. The sealing material is made of a photocuring resin, and is cured by irradiation with light through each of the substrates.

(7) A liquid crystal display device according to the invention includes, for example, substrates disposed in opposition to one another with a liquid crystal material interposed therebetween, a black matrix formed on a liquid-crystal-side surface of one of the substrates, an organic material layer formed on a liquid-crystal-side surface of another of the substrates, and a sealing material made of a photocuring resin and formed to fix the substrates to one another and seal the liquid crystal material. One of the black matrix and the organic material layer extends beyond the sealing material, while the other extends to a location which is not beyond the sealing material.

(8) A liquid crystal display device according to the invention includes, for example, substrates disposed in opposition to one another with a liquid crystal material Interposed therebetween, an organic material layer and a black matrix formed on a liquid-crystal-side surface of one of the substrates, and a sealing material made of a photocuring resin and formed to fix the substrates to one another and seal the liquid crystal material. Both the black matrix and the organic material layer extend beyond the sealing material.

(9) A liquid crystal display device according to the invention includes, for example, substrates disposed in opposition to one another with a liquid crystal material interposed therebetween, and a sealing material made of a photocuring resin and formed to fix the substrates to one another and seal the liquid crystal material. A fence is formed inside the sealing material approximately in parallel with the sealing material.

(10) A liquid crystal display device according to the invention is based on, for example, the construction described in paragraph (9), and column-shaped spacers are formed on a liquid-crystal-side surface of one of the substrates, the fence being made of the same material as the column-shaped spacers.

(11) A liquid crystal display device according to the invention includes, for example, substrates disposed in opposition to one another with a liquid crystal material interposed therebetween, and a sealing material made of a photocuring resin and formed to fix the substrates to one another and seal the liquid crystal material. Alignment films, which are formed on liquid-crystal-side surfaces of the respective substrates are formed so as not to be disposed in contact with the sealing material.

(12) A liquid crystal display device includes, for example, a pair of substrates disposed in opposition to one another with a liquid crystal material interposed therebetween; active elements formed on one of the pair of substrates; an organic film layer formed to cover the active elements; a light-shielding film formed on another of the pair of substrates; and a substrate sealing material which sticks the pair of substrates together, the sealing material having an injecting port formed therein, which is sealed with an end-sealing material and spaced apart; the light-shielding layer and the organic film layer being formed to extend outward from the sealing material, the organic film layer being at least partly removed at the injecting port.

(13) A liquid crystal display device includes, for example, a pair of substrates disposed in opposition to one another with a liquid crystal material interposed therebetween; active elements formed on one of the pair of substrates; an organic film layer formed to cover the active elements; and a sealing material which sticks the pair of substrates together, the sealing material having an injecting port formed therein, which is sealed with an end-sealing material and spaced apart; the organic film layer having an end which is linear along a side where the injecting port is formed, the end being disposed outside the sealing material and inside the end-sealing material.

(14) A liquid crystal display device includes, for example, a pair of substrates disposed in opposition to one another with a liquid crystal material interposed therebetween; active elements formed on one of the pair of substrates; an organic film layer formed to cover the active elements; and a sealing material which sticks the pair of substrates together, the sealing material having an injecting port formed therein, which is sealed with an end-sealing material and spaced apart, in a portion where the end-sealing material is formed, a distance from a side end of the one of the pair of substrates to the organic film layer is larger than the sealing material portion at the portion where the end-sealing material is formed.

(15) A liquid crystal display device includes, for example, a pair of substrates disposed in opposition to one another with a liquid crystal material interposed therebetween; active elements formed on one of the pair of substrates; an organic film layer formed to cover the active elements; and a sealing material which sticks the pair of substrates together, the sealing material having an injecting port formed therein, which is sealed with an end-sealing material, the injecting port having an isolated sealing material, the organic film layer being formed in the isolated sealing material, the isolated sealing material being in contact with the end-sealing material, the organic film layer formed in the isolated sealing material being spaced apart from the end-sealing material.

(16) A liquid crystal display device includes, for example, a pair of substrates disposed in opposition to one another with a liquid crystal material interposed therebetween; active elements formed on one of the pair of substrates; an organic film layer formed to cover the active a elements; a light-shielding film formed on another of the pair of substrates; and a sealing material which sticks the pair of substrates together, the sealing material being integrally formed along the entire periphery of a screen region, one of the light-shielding layer and the organic film layer being formed to extend beyond an area where the sealing material is formed, and the other being formed inside the area where the sealing material is formed.

(17) A liquid crystal display device includes, for example, a pair of substrates disposed in opposition to one another with a liquid crystal material interposed therebetween; active elements formed on one of the pair of substrates; an organic film layer formed to cover the active elements; a light-shielding film formed on another of the pair of substrates; and a sealing material which sticks the pair of substrates together, the sealing material being integrally formed along the entire periphery of a screen region, the light-shielding layer and the organic film layer having regions superposed on each other, the organic film layer having a hole in a region corresponding to the regions superposed on each other.

BRIEF DESCRIPTION OF THE DRAWINGS

The invention will become more readily appreciated and understood from the following detailed description of preferred embodiments of the invention, when taken in conjunction with the accompanying drawings, in which.

DETAILED DESCRIPTION

Embodiments of a liquid crystal display device according to the invention will be described below with reference to the accompanying drawings.

Embodiment 1

Equivalent Circuit

Figure 2:
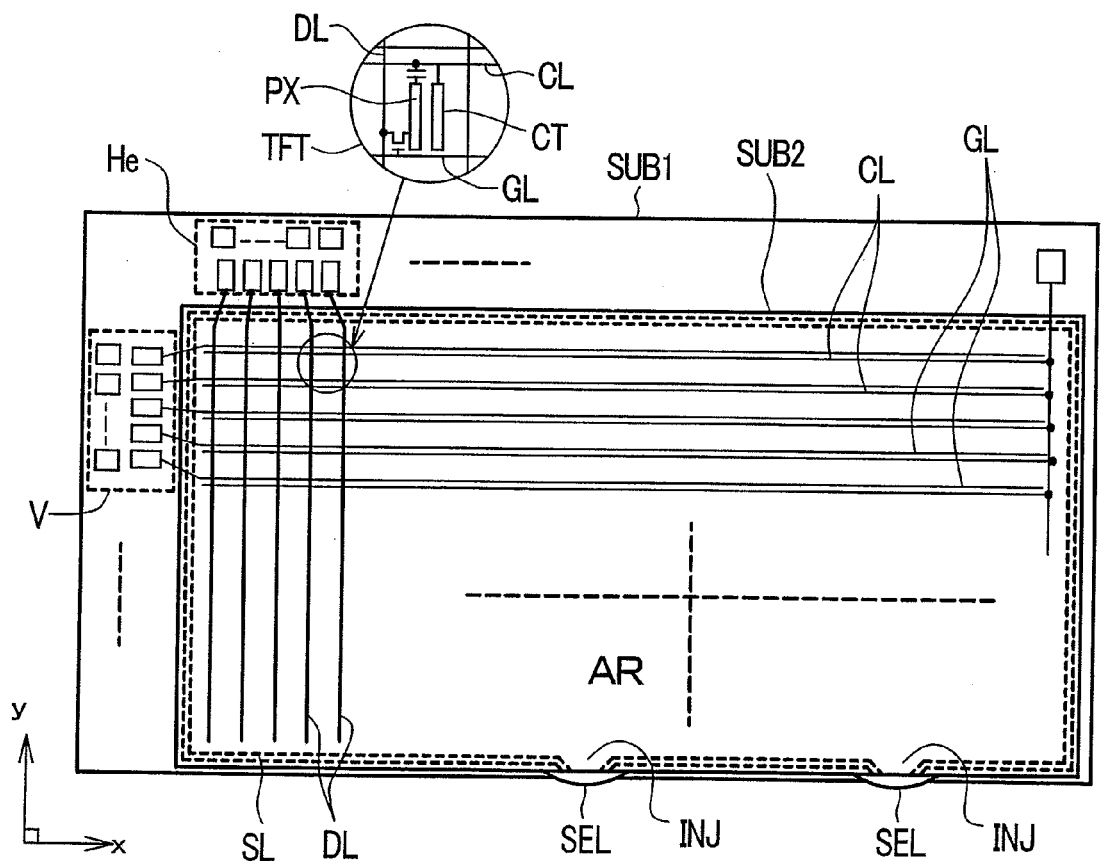
FIG. 2 is an equivalent circuit diagram showing one embodiment of the liquid crystal display device according to the invention.

FIG. 2 is an equivalent circuit diagram showing Embodiment 1 of a liquid crystal display device according to the invention. FIG. 2 is an equivalent circuit diagram which is depicted to correspond to the actual geometrical arrangement of the liquid crystal display device.

In FIG. 2, there are a pair of transparent substrates SUB1 and SUB2 which are disposed in opposition to each other with a liquid crystal material interposed therebetween. The liquid crystal material is sealed by a sealing material SL, which also serves to secure the transparent substrate SUB2 to the transparent substrate SUB1.

Liquid crystal injecting ports INJ are formed in a portion of the sealing material SL (for example, the portion of the sealing material SL shown at the bottom of the panel in FIG. 2). After the liquid crystal material has been injected into the region surrounded by the sealing material SL through the liquid crystal injecting ports INJ, liquid crystal sealing materials SEL for sealing the respective liquid crystal injecting ports INJ is applied. In Embodiment 1, the liquid crystal sealing materials SEL is made of a photocuring resin.

Gate signal lines GL and drain signal lines DL are formed on a liquid-crystal-side surface of the transparent substrate SUB1 surrounded by the sealing material SL. The gate signal lines GL are disposed so as to extend in the x direction and to be juxtaposed in the y direction, as viewed in FIG. 2, while the drain signal lines DL are disposed so as to extend in the y direction and to be juxtaposed in the x direction, as viewed in FIG. 2.

Rectangular areas, each of which is surrounded by adjacent ones of the gate signal lines GL and adjacent ones of the drain signal lines DL, constitute pixel areas, respectively, and a matrix-formed aggregation of these pixel areas constitutes a liquid crystal display part AR.

Counter voltage signal lines CL, each of which is common to pixel areas juxtaposed in each row in the x direction, are formed to run through the pixel areas along the respective rows. Each of the counter voltage signal lines CL serves as a signal line for supplying a voltage which serves as a reference for a video signal to a counter electrode CT (to be described later) of each of the pixel areas.

A thin film transistor TFT and a pixel electrode PX are formed in each of the pixel areas. The thin film transistor TFT is operated by a scanning signal from one of the adjacent gate signal lines GL, and the pixel electrode PX is supplied with a video signal from one of the adjacent drain signal lines DL via this thin film transistor TFT. This pixel electrode PX is arranged to generate a voltage difference between the pixel electrode PX and the counter electrode CT connected to the counter voltage signal line CL, whereby the optical transmissivity of the liquid crystal is controlled by the voltage difference.

One end of each of the gate signal lines GL is formed so as to extend beyond the sealing material SL, and the extended end constitutes a terminal to which an output terminal of a vertical scanning driver circuit V is connected. Signals from a printed circuit board, which is disposed outside a liquid crystal display panel, are inputted to input terminals of the vertical scanning driver circuit V.

The vertical scanning driver circuit V is formed of a plurality of semiconductor devices, and mutually adjacent ones of the plural gate signal lines GL are grouped, with one semiconductor device being assigned to each group.

Similarly, one end of each of the drain signal lines DL is formed so as to extend beyond the sealing material SL, and the extended end constitutes a terminal to which an output terminal of a video signal driver circuit He is connected. Signals from a printed circuit board, which is disposed outside the liquid crystal display panel, are inputted to input terminals of the video signal driver circuit He.

The video signal driver circuit He is formed of a plurality of semiconductor devices, and mutually adjacent ones of the plural drain signal lines DL are grouped, with one semiconductor device being assigned to each group.

The counter voltage signal lines CL, each of which is common to the pixel areas juxtaposed in each row in the x direction, are connected to a common connection line, for example, at their right-hand ends, as viewed in FIG. 2. The connection line is formed so as to extend beyond the sealing material SL, and it constitutes a terminal CLT at its extended end. The voltage which serves as a reference for a video signal is supplied from this terminal CLT.

Each one of the gate signal lines GL is sequentially selected by a scanning signal from the vertical scanning driver circuit V. In addition, a video signal is supplied to each of the drain signal lines DL by the video signal driver circuit He in synchronism with the timing of selection of each one of the gate signal lines GL.

<<Construction of a Pixel>>

Figure 3:
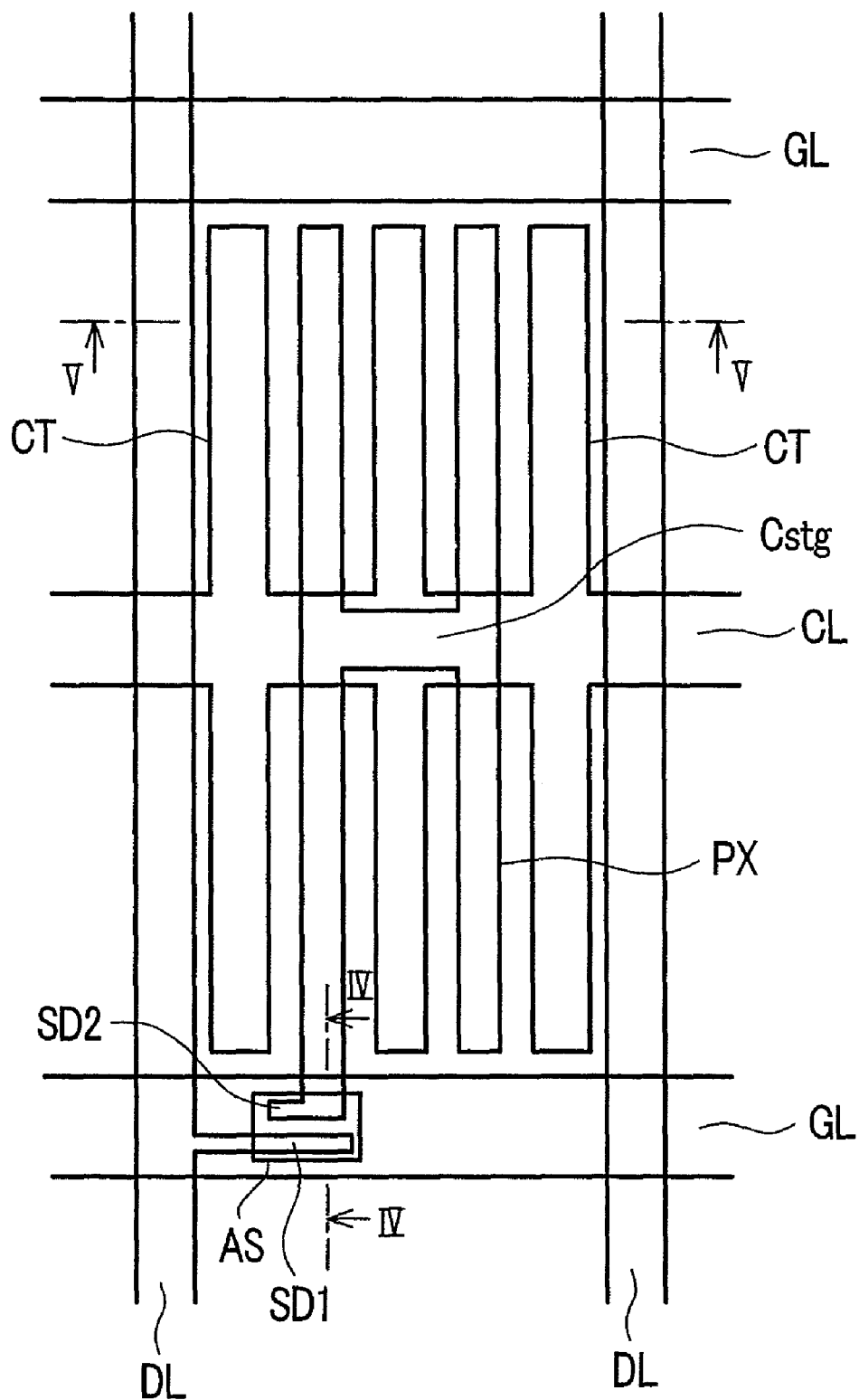
FIG. 3 is a plan view showing one embodiment of a pixel area of the liquid crystal display device according to the invention.
Figure 4:
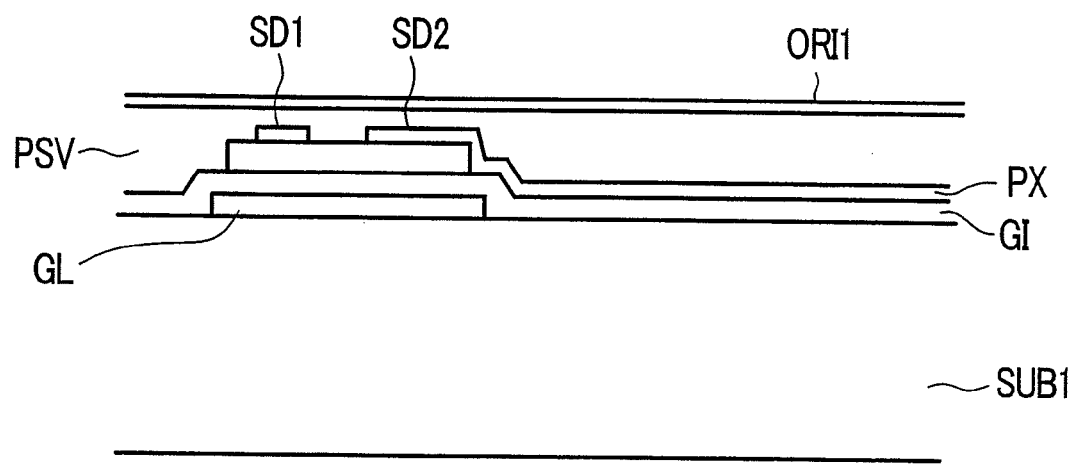
FIG. 4 is a cross-sectional view taken along line IV-IV of FIG. 3.
Figure 5:
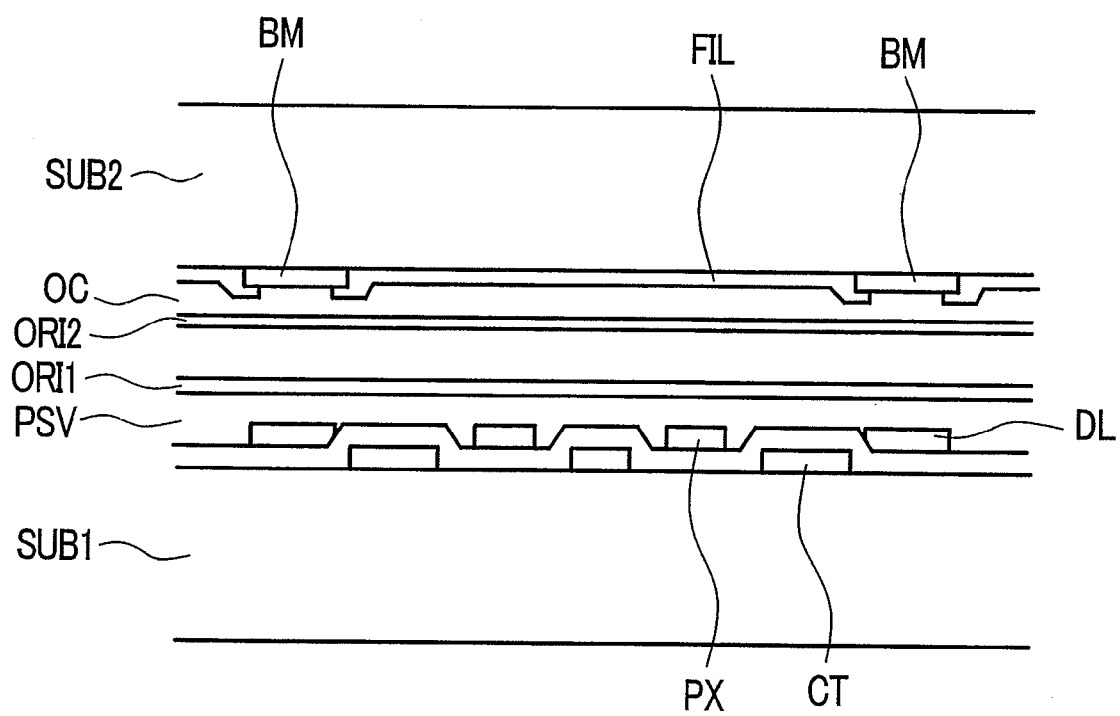
FIG. 5 is a cross-sectional view taken along line V-V of FIG. 3.

FIG. 3 is a plan view showing one embodiment of the construction of the above-described pixel area. FIG. 4 is a cross-sectional view taken along line IV-IV of FIG. 3, and FIG. 5 is a cross-sectional view taken along line V-V of FIG. 3.

As shown in FIG. 3, a pair of gate signal lines GL, which are disposed so as to extend in the x direction and to be juxtaposed in the y direction, are formed on the liquid-crystal-side surface of the transparent substrate SUB1. These gate signal lines GL and a pair of drain signal lines DL, which will be described later, surround a rectangular area so that this rectangular area is constructed as a pixel area. One counter voltage signal line CL, which is disposed in parallel with the gate signal lines GL, is formed in an area between the gate signal lines GL.

The counter electrode CT is formed in approximately the whole of the pixel area. This counter electrode CT is formed integrally with the counter voltage signal line CL, and it is spaced from each of the gate signal lines GL by a predetermined distance so that the counter electrode CT is not electrically connected to either of the gate signal lines GL. This counter electrode CT is formed as a plurality of (in FIG. 3, three) electrodes which are disposed so as to extend in the y direction and to be juxtaposed in the x direction, as viewed in FIG. 3, and the separation distance between each of the electrodes is equal.

Among the electrodes, one pair of counter electrodes CT, which are respectively disposed on the opposite extreme sides of the pixel area, that is to say, the respective counter electrodes CT adjacent to the drain signal lines DL, which will be described later, are formed so as to be slightly larger in width than the other counter electrodes CT. The reason for this is that electric fields generated from the respective drain signal lines DL can be easily terminated on the adjacent counter electrodes CT so that the electric fields are prevented from terminating on the pixel electrode PX (to be described later) beyond the adjacent counter electrodes CT. This is because, when the electric fields terminate on the pixel electrode PX, the electric fields produce noise.

An insulating film GI (refer to FIGS. 4 and 5) that is made of, for example, SiN is formed to cover the gate signal lines GL and the counter voltage signal lines CL on the surface of the transparent substrate SUB1 on which the gate signal lines GL and the common electrode lines CL are formed in the above-described manner. This insulating film GI has the function of an interlayer insulating film between the gate signal lines GL and the counter voltage signal lines CL in an area in which the drain signal lines DL (to be described later) are formed, the function of a gate insulating film for a thin film transistor TFT (to be described later) in an area in which the thin film transistor TFT is formed, and the function of a dielectric film for a capacitance element Cstg (to be described later) in an area in which the capacitance element Cstg is formed.

A semiconductor layer AS that is made of, for example, amorphous Si is formed on a surface of the insulating film GI in such a manner as to overlap a part of the gate signal line GL. This semiconductor layer AS constitutes the semiconductor layer of the thin film transistor TFT, and a drain electrode SD1 and a source electrode SD2 are formed on the upper surface of the semiconductor layer AS, thereby forming a reverse staggered structure MIS transistor which uses a part of the gate signal line GL as its gate electrode.

The drain electrode SD1 and the source electrode SD2 are formed at the same time that the drain signal line DL is formed. Specifically, the drain signal lines DL are formed so as to extend in the y direction and to be juxtaposed in the x direction, as viewed in FIG. 3, and a part of each of the drain signal lines DL is formed so as to extend onto the upper surface of the semiconductor layer AS to form the drain electrode SD1. The source electrode SD2 is formed so as to be spaced apart from the drain electrode SD1 by a distance equivalent to the channel length of the thin film transistor TFT.

This source electrode SD2 is formed so as to slightly extend from the upper surface of the semiconductor layer AS onto the upper surface of the insulating film GI within the pixel area, so that the source electrode SD2 is formed integrally with the pixel electrode PX.

This pixel electrode PX is made of a plurality of (in FIG. 3, two) electrodes which are disposed so as to extend in the y direction and to be juxtaposed in the x direction, similarly to the counter electrode CT, and, as seen in plan view, each of the electrodes is positioned between adjacent ones of the counter electrodes CT. Specifically, all of the above-described electrodes within the pixel area are equidistantly disposed in the order of counter electrode CT, pixel electrode PX, counter electrode CT, pixel electrode PX, . . . , and counter electrode CT from one to the other of the drain signal lines DL.

The plurality of electrodes which constitute the pixel electrode PX are electrically connected to one another in a portion where the electrodes overlap the counter voltage signal line CL. The portion where these pixel electrodes PX are electrically connected to one another is a comparatively large area, and in this portion, the capacitance element Cstg, which uses the insulating film GI as its dielectric film, is formed between the pixel electrode PX and the counter voltage signal line CL. This capacitance element Cstg has functions, such as storing a video signal supplied to the pixel electrode PX for a comparatively long period.

A thin layer doped with high concentrations of impurities is formed at the interface between the semiconductor layer AS and each of the drain electrode SD1 and the source electrode SD2. This layer functions as a contact layer. This contact layer can be formed, for example, by the process of forming a high-concentration impurity layer on the surface of the semiconductor layer AS during the formation of the semiconductor layer AS, and etching the impurity layer exposed from a mask formed by a pattern made of the drain electrode SD1 and the source electrode SD2 formed on the upper surface of the high-concentration impurity layer.

A protective film PSV (refer to FIGS. 4 and 5), which is made of an organic material layer, such as a resin, is formed on the surface of the transparent substrate SUB1 on which the thin film transistors TFT, the drain signal lines DL, the drain electrodes SD1, the source electrodes SD2 and the pixel electrode PX are formed in the above-described manner. This protective film PSV serves as a film for avoiding direct contact between the thin film transistors TFT and the liquid crystal, and it prevents the characteristic degradation of the thin film transistors TFT. This protective film PSV is made of a stacked structure in which an inorganic material layer made of, for example, SiN and an organic material layer made of, for example, resin are stacked in that order. By using this protective film PSV, it is possible to level the liquid-crystal-side surface thereof, whereby it is possible to uniformize the layer thickness of the liquid crystal, and it is also possible to improve the reliability of rubbing on an alignment film ORI1.

The alignment layer ORI1 is formed on the upper surface of the protective film PSV. The alignment layer ORI1 is a film which is in direct contact with the liquid crystal, and it serves to determine the initial alignment direction of molecules of the liquid crystal by means of rubbing on the surface of the alignment layer ORI1.

A black matrix BM is formed to separate the individual pixel areas on the liquid-crystal-side surface of the transparent substrate SUB2, that is disposed in opposition to the transparent substrate SUB1 constructed in this manner, with the liquid crystal material interposed therebetween. This black matrix BM has a pattern in which an aperture is formed in the central portion of each of the pixel areas, except at the periphery thereof, to improve the contrast of the display.

In addition, the black matrix BM is formed to cover fully the thin film transistors TFT on the transparent substrate SUB1 to prevent the thin film transistors TFT from being irradiated with external light, thereby avoiding the characteristic degradation of the thin film transistors TFT.

The black matrix BM is made of a resin film containing, for example, a black pigment, and it is formed so as to extend to the periphery of the transparent substrate SUB2. The reason why the black matrix BM is extended to the periphery of the transparent substrate SUB2 in this manner is to use the black matrix BM to prevent light from a backlight disposed on the back surface of the liquid crystal display device from leaking toward the display observation side.

Color filters FIL are formed to cover the respective apertures of the black matrix BM on the surface of the transparent substrate SUB2 on which the black matrix BM is formed. These color filters FIL are made of, for example, filters of different colors, such as red (R), green (G) and blue (B). The color filters FIL are disposed in such a manner that filters of a particular color, such as red (R), are formed in common with the pixel areas juxtaposed along a particular column in the y direction, and filters of a different color, such as green (G) are formed in common with the pixel areas juxtaposed along the next column disposed adjacent to the particular column in the x direction, so that the color filter elements FIL are arranged in the order of, for example, red (R), green (G), blue (B), red (R), . . . , from column to column in the x direction. Each of the color filter elements FIL is made of a resin film containing a pigment for the corresponding color.

A leveling film OC is formed to cover the black matrix BM and the color filters FIL on the surface of the transparent substrate SUB2 on which the black matrix BM and the color filters FIL are formed. This leveling film OC is made of a resin which can be formed by application, and it is provided for preventing steps from appearing on the surface of the transparent substrate SUB2 as a result of the formation of the black matrix BM and the color filters FIL.

An alignment film ORI2 is formed on the surface of the leveling film OC. The alignment film OR12 is a film which is in direct contact with the liquid crystal, and the initial alignment direction of molecules of the liquid crystal is determined by rubbing formed on the surface of the alignment film ORI2.

<<Constructions of the Liquid Crystal Injecting Port and the Vicinity Thereof>>

Figure 1:
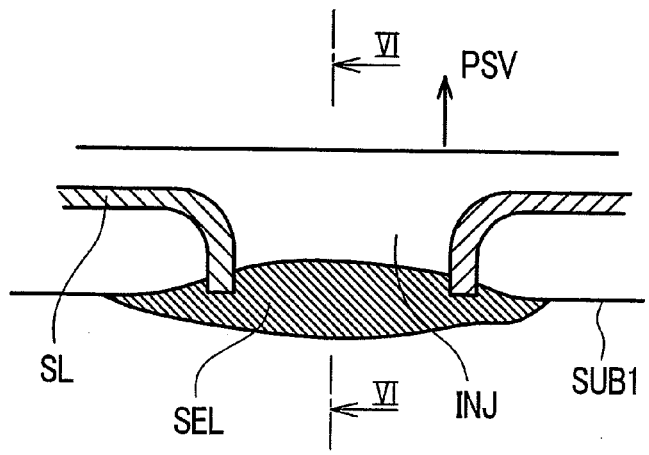
FIG. 1 is a diagrammatic plan view showing one embodiment of a liquid crystal display device according to the invention, showing the portion including a liquid crystal sealing material.
Figure 6:
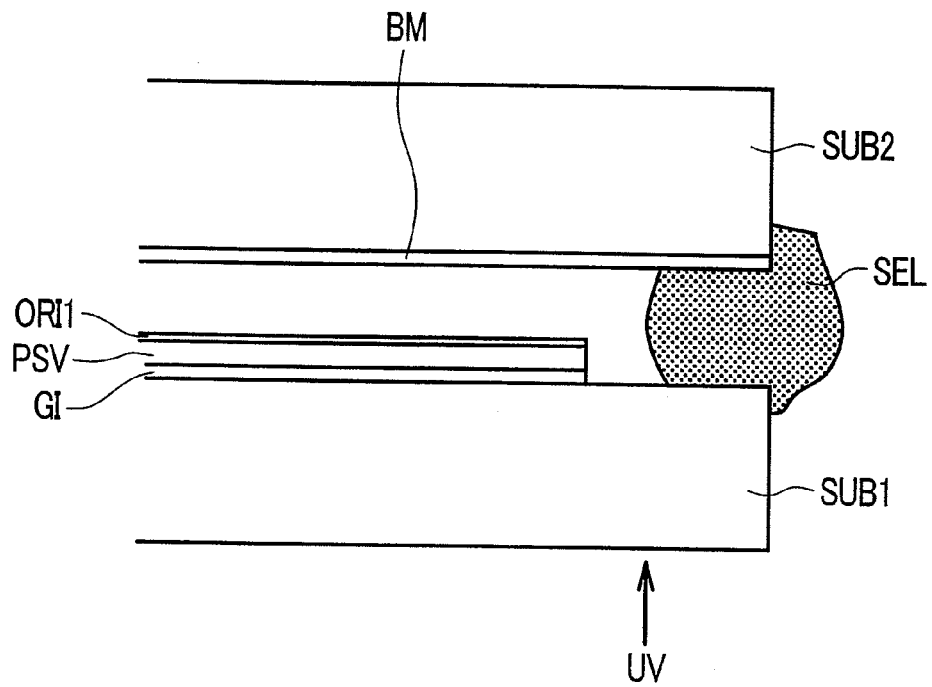
FIG. 6 is a cross-sectional view taken along line VI-VI of FIG. 1.

FIG. 1 is a plan view showing on an enlarged scale the liquid crystal injecting port INJ shown in FIG. 2 and the vicinity thereof, and FIG. 6 is a cross-sectional view taken along line VI-VI of FIG. 1.

As shown in FIG. 1, the liquid crystal injecting port INJ is formed as an open portion in a part of the sealing material SL, and the ends of the open portion in the sealing material SL extend outwardly of the transparent substrate SUB1.

As shown in FIG. 6, a stacked structure, in which the insulating film GI, the protective film PSV and the alignment film ORI1 are stacked in that order, is formed so as to extend to a location which is not beyond the end surface of the transparent substrate SUB1 on the liquid-crystal-side surface of the transparent substrate SUB1. More specifically, the stacked structure is formed so as to extend to a location which is not beyond a location where the liquid crystal sealing material SEL for sealing the liquid crystal injecting port INJ is formed. That is to say, the stacked structure is formed to avoid the location where the liquid crystal sealing material SEL is disposed.

In this case, at least the protective film PSV needs only to be formed to avoid the location where the liquid crystal sealing material SEL is formed, and another film, such as the insulating film GI or the alignment film ORI1, may be extended to the location where the liquid crystal sealing material SEL is formed. As will be apparent from the following description, this is because another film, such as the insulating film GI or the alignment film ORI1, has a comparatively small thickness and good optical transmissivity for UV light.

The black matrix BM is formed on the liquid-crystal-side surface of the transparent substrate SUB2, and this black matrix BM is formed so as to reach the end surface of the transparent substrate SUB2, whereby the black matrix BM is formed to reach the location where the liquid crystal sealing material SEL is formed. The reason for this is that, as described previously, in the case where a backlight is disposed on the back surface of the liquid crystal display device, light from the backlight needs to be prevented from leaking toward the display observation side of the panel.

In the liquid crystal display device constructed in the above-described manner, after the liquid crystal material has been injected through the liquid crystal injecting port INJ, the liquid crystal injecting port INJ is sealed with the liquid crystal sealing material SEL and the liquid crystal sealing material SEL is cured by irradiation with UV light. At this time, irradiation with UV light from the side of the transparent substrate SUB2 is blocked by the black matrix BM, whereas irradiation with UV light from the side of the transparent substrate SUB1 is applied to the liquid crystal sealing material SEL without being attenuated by the stacked structure in which the insulating film GI, the protective film PSV and the alignment film ORI1 are stacked in that order.

Accordingly, the liquid crystal sealing material SEL can be fully cured with no uncured portion remaining therein as in the related art, whereby it is possible to eliminate the problem that part of the liquid crystal sealing material SEL elutes in the liquid crystal material as a contaminant, whereby a display irregularity is observed in the liquid crystal display part AR in the periphery of the liquid crystal injecting port INJ.

Embodiment 2

Figure 7:
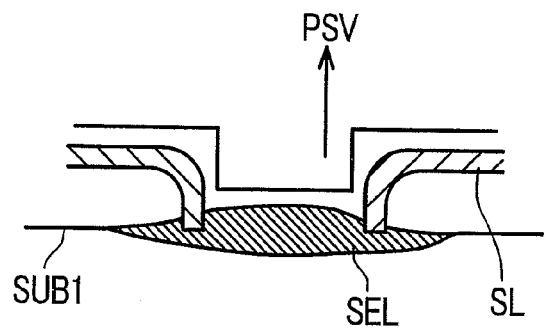
FIG. 7 is a diagrammatic plan view showing another embodiment of the liquid crystal display device according to the invention.

FIG. 7 is a plan view showing another embodiment of the liquid crystal display device according to the invention, and it corresponds to FIG. 1. As compared with Embodiment 1 shown in FIG. 1, the protective film PSV of Embodiment 2 has a different construction in that the protective film PSV is not extended to the area in which the liquid crystal sealing material SEL is formed, but is formed to be as close as possible to the liquid crystal sealing material SEL. Accordingly, the protective film PSV is positioned inside the sealing material SL in which the liquid crystal sealing material SEL is formed, but is formed to have a projecting pattern in the area in which the liquid crystal sealing material SEL is formed.

The reason for this is to retain the gap between the substrates SUB1 and SUB2 within the liquid crystal display part AR in the vicinity of the liquid crystal sealing material SEL so as to avoid a display irregularity in the vicinity of the liquid crystal sealing material SEL.

Embodiment 3

Figure 8:
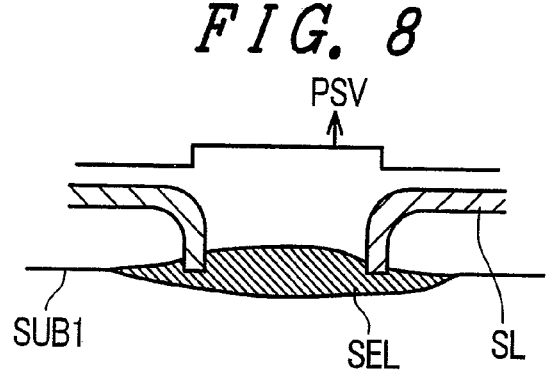
FIG. 8 is a diagrammatic plan view showing another embodiment of the liquid crystal display device according to the invention.

FIG. 8 is a plan view showing another embodiment of the liquid crystal display device according to the invention, and it corresponds to FIG. 1.

As compared with Embodiment 1 shown in FIG. 1, the protective film PSV of Embodiment 3 has a different construction in that the protective film PSV is formed so that its peripheral edge is as close as possible to the sealing material SL in which the liquid crystal sealing material SEL is formed, and it is also formed to have a pattern which is slightly recessed into the liquid crystal display part AR in the portion adjacent to the liquid crystal sealing material SEL.

Even with this construction, it is possible to obtain a similar advantage, because the protective film PSV does not exist in the vicinity of the liquid crystal sealing material SEL.

Embodiment 4

Figure 9:
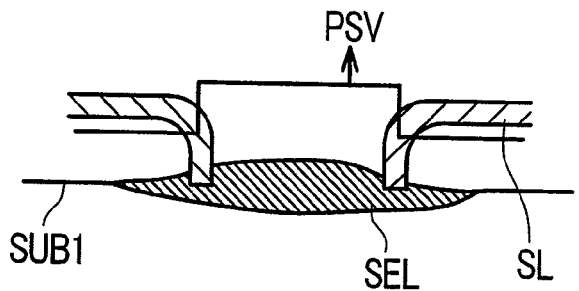
FIG. 9 is a diagrammatic plan view showing another embodiment of the liquid crystal display device according to the invention.

FIG. 9 is a plan view showing another embodiment of the liquid crystal display device according to the invention, and it corresponds to FIG. 1.

As compared with Embodiment 1 shown in FIG. 1, the protective film PSV of Embodiment 4 has a different construction in that the protective film PSV is formed so that its peripheral side is disposed outside the sealing material SL in which the liquid crystal sealing material SEL is formed, and it is also formed to have a pattern which is slightly recessed into the liquid crystal display part AR in the portion adjacent to the liquid crystal sealing material SEL.

With this construction, it is possible to uniformize the gap between the transparent substrates SUB1 and SUB2 because the sealing material SL can ensure the gap via the protective film PSV even at locations other than the location where the liquid crystal sealing material SEL is formed.

Embodiment 5

Figure 10:
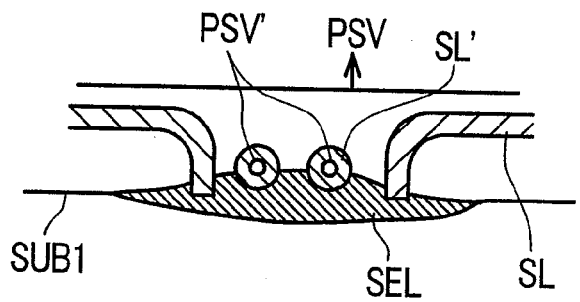
FIG. 10 is a diagrammatic plan view showing another embodiment of the liquid crystal display device according to the invention.

FIG. 10 is a plan view showing another embodiment of the liquid crystal display device according to the invention, and it corresponds to FIG. 1.

As compared with Embodiment 1 shown in FIG. 1, Embodiment 5 has a different construction in that members are provided for ensuring the gap between the transparent substrates SUB1 and SUB2 in a liquid crystal injecting passage within the liquid crystal injecting port INJ. Each of these members has a stacked structure in which an organic material layer PSV' and an organic material layer SL' are stacked in that order. The organic material layer PSV' is formed at the same time as the formation of the protective film PSV, while the organic material layer SL' is formed at the same time as the formation of the sealing material SL.

In this case, the organic material layer SL', which is formed at the same time as the formation of the sealing material SL, may also be formed to cover the organic material layer PSV', which is formed at the same time as the formation of the protective film PSV.

According to this construction, it is possible to avoid the problem that a difference in the gap between the substrates SUB1 and SUB2 between the liquid crystal display part AR and the liquid crystal injecting port INJ occurs owing to the fact that the protective film PSV is not formed at the liquid crystal injecting port INJ.

Embodiment 6

Figure 11:
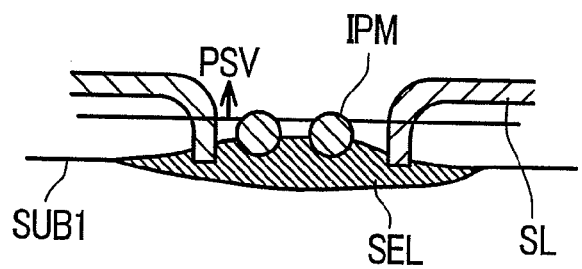
FIG. 11 is a diagrammatic plan view showing another embodiment of the liquid crystal display device according to the invention.

FIG. 11 is a plan view showing another embodiment of the liquid crystal display device according to the invention, and it corresponds to FIG. 1.

As compared with Embodiment 1 shown in FIG. 1, Embodiment 6 has a different construction in that invasion preventing members IPM, for preventing the liquid crystal sealing material SEL from invading the liquid crystal display part AR, are provided in a liquid crystal injecting passage within the liquid crystal injecting port INJ. These invasion preventing members 1PM are formed at the same time as the formation of the sealing material SL, and are formed within the area in which the liquid crystal sealing material SEL is formed.

Accordingly, Embodiment 6 can provide the advantage that the protective film PSV is formed so as to extend to the vicinity of the liquid crystal injecting port INJ, and further, the protective film PSV can be formed so as to extend beyond the sealing material SL.

Embodiment 7

Figure 12:
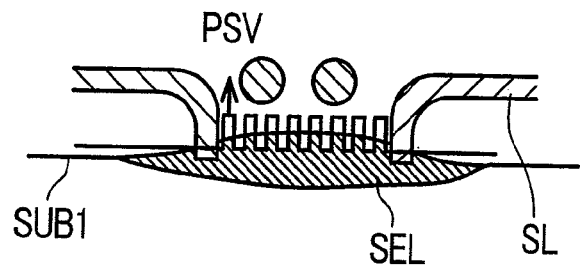
FIG. 12 is a diagrammatic plan view showing another embodiment of the liquid crystal display device according to the invention.

FIG. 12 is a plan view showing another embodiment of the liquid crystal display device according to the invention, and it corresponds to FIG. 1.

As compared with Embodiment 1 shown in FIG. 1, Embodiment 7 has a different construction in that the protective film PSV is formed so as to extend beyond the sealing material SL, and the extended end is formed in a zigzag manner in the liquid crystal injecting port INJ.

In this case, the zigzag pattern has cuts extending toward the liquid crystal display part AR in such a manner as to be fully larger in depth than in width. For example, when the liquid crystal injecting port INJ is sealed with the liquid crystal sealing material SEL, part of the zigzag pattern is exposed from the liquid crystal sealing material SEL.

The reason why the zigzag pattern is made of such cuts in the protective film PSV is that, when the zigzag pattern is irradiated with UV light from the transparent substrate SUB1, the UV light is fully irradiated onto the liquid crystal sealing material SEL through the cuts in the protective film PSV. According to this construction, the liquid crystal sealing material SEL can be fully cured with no uncured portion remaining therein.

In addition, as described above, when the liquid crystal injecting port INJ is sealed with the liquid crystal sealing material SEL, part of the zigzag pattern in the protective film PSV is exposed from the liquid crystal sealing material SEL, whereby transmission of UV light through the exposed part of the protective film PSV occurs and contributes to the curing of the liquid crystal sealing material SEL.

Embodiment 8

Figure 13:
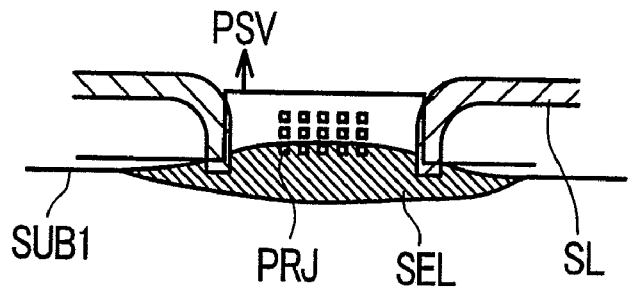
FIG. 13 is a diagrammatic plan view showing another embodiment of the liquid crystal display device according to the invention.

FIG. 13 is a plan view showing another embodiment of the liquid crystal display device according to the invention, and it corresponds to FIG. 1.

As compared with Embodiment 1 shown in FIG. 1, Embodiment 8 has a different construction in that the peripheral edge of the protective film PSV along the sealing material SL in the region in which the liquid crystal injecting port INJ is not formed is formed so as to extend beyond the sealing material SL, and, in addition, it is formed to be recessed into the liquid crystal display part AR in the vicinity of the liquid crystal injecting port INJ.

In addition, a plurality of projections PRJ, which are arranged, for example, in matrix form, are formed in the portion of the liquid crystal sealing material SEL where the protective film PSV is recessed in the liquid crystal injecting port INJ. These projections PRJ are formed at the same time as the formation of the protective film PSV, and they are made of the same material as the protective film PSV.

Each of these projections PRJ provides the function of causing the gap between the transparent substrates SUB1 and SUB2 at the liquid crystal injecting port INJ to be similar to that in the liquid crystal display part AR.

UV light from the transparent substrate SUB1 is fully irradiated onto the liquid crystal sealing material SEL.

Embodiment 9

Figure 14:
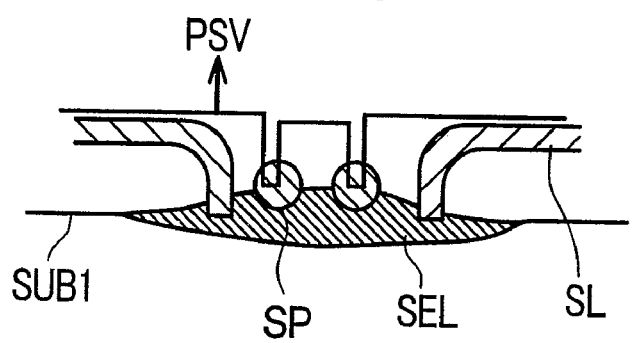
FIG. 14 is a diagrammatic plan view showing another embodiment of the liquid crystal display device according to the invention.

FIG. 14 is a plan view showing another embodiment of the liquid crystal display device according to the invention, and it corresponds to FIG. 1.

As compared with Embodiment 1 shown in FIG. 1, Embodiment 9 has a different construction in that the extension of the peripheral edge of the protective film PSV stops inside the sealing material SL, and it has, for example, two projecting portions that extend toward the liquid crystal sealing material SEL in the liquid crystal injecting port INJ.

In addition, the heads of column-shaped spacers SP formed on the transparent substrate SUB2 are disposed so as to be opposed to these extended portions, respectively. Such spacers SP are similarly formed in the liquid crystal display part AR, and each of the spacers SP is formed on the same material layer that constitutes the protective film PSV.

Accordingly, the spacers SP provide an advantage which enables the gap between the transparent substrates SUB1 and SUB2 in the liquid crystal display part AR to be ensured in the portion of the liquid crystal injecting port INJ.

Embodiment 10

Embodiment 10 differs from each of the above-described embodiments, and it is intended to provide a construction in which the sealing material SL, which serves to secure the transparent substrate SUB2 to the transparent substrate SUB1, does not have the liquid crystal injecting ports INJ.

Figure 15:
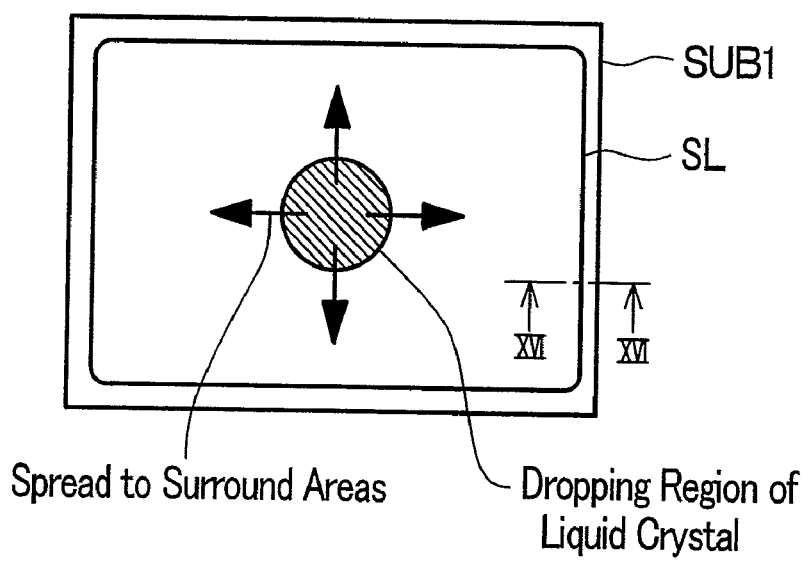
FIG. 15 is a plan view showing another embodiment of the liquid crystal display device according to the invention.

Specifically, as shown in FIG. 15; the sealing material SL, having the shape of a rectangular frame, is formed on the liquid-crystal-side surface of the transparent substrate SUB1, and a liquid crystal material is dropped and charged in the area surrounded by the sealing material SL. After that, the transparent substrate SUB2 is joined to the transparent substrate SUB1 and the sealing material SL is cured by UV light, thereby securing the transparent substrates SUB1 and SUB2 to each other and sealing the liquid crystal material therebetween.

The liquid crystal display device constructed in this manner has the feature that, when a low-frequency voltage or a direct-current voltage is applied to the liquid crystal material, the trace of the dropped liquid crystal material can be observed in a portion where the liquid crystal material is dropped.

The liquid crystal display device constructed in this manner uses a photocuring resin as the sealing material SL, and it has the advantage that, because the curing of the sealing material SL is effected by irradiation with UV light, the sealing can be completed in a short time without generating heat. Accordingly, it is possible to prevent the liquid crystal material from being degraded by heat, whereby it is possible to eliminate the problem that part of the uncured liquid crystal sealing material SL elutes in the liquid crystal material and contaminates the liquid crystal material.

Incidentally, it goes without saying that a sealing portion through which excess liquid crystal material is discharged, or a sealing portion through which bubbles are discharged, may be formed in a portion of the sealing material SL.

Embodiment 11

Figure 16:
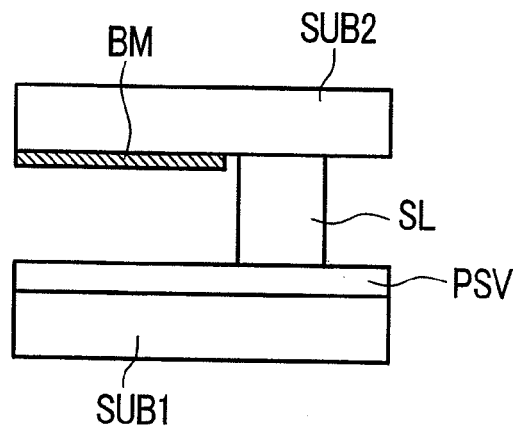
FIG. 16 is a cross-sectional view taken along line XVI-XVI of FIG. 15.

FIG. 16 is a cross-sectional view showing the construction of the sealing material SL and the construction in the vicinity thereof in the case where a photocuring resin is used for the sealing material SL, as in the above-described Embodiment 10. FIG. 16 is a cross-sectional view taken along line XVI-XVI of FIG. 15.

In Embodiment 11, the protective film PSV, which is made of an organic material layer, is formed on the liquid-crystal-side surface of the transparent substrate SUB1, and the protective film PSV is formed so as to extend so that its peripheral edge is disposed beyond the sealing material SL. The black matrix BM formed on the transparent substrate SUB2 is formed so that its peripheral edge is extended to a location which is not beyond a location where the sealing material SL is formed. Accordingly, UV light to be irradiated during the curing of the sealing material SL can be obtained in a sufficient amount from the transparent substrate SUB2.

Embodiment 12

Figure 17:
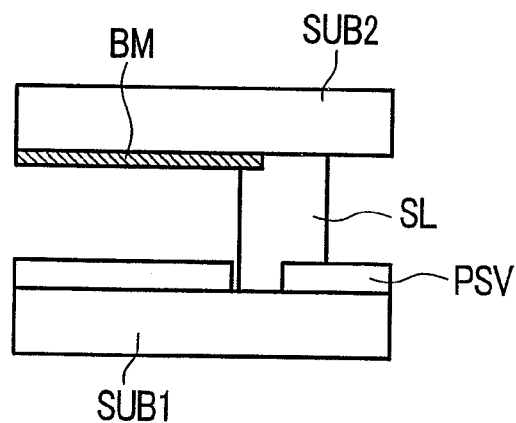
FIG. 17 is a diagrammatic cross-sectional view showing another embodiment of the liquid crystal display device according to the invention.

FIG. 17 is a cross-sectional view showing the construction of another embodiment of the liquid crystal display device according to the invention, and it corresponds to FIG. 16.

As compared with Embodiment 11 shown in FIG. 16, Embodiment 12 has a different construction in that the black matrix BM is formed so that its peripheral edge is inserted into a part of the sealing material SL. The protective film PSV, which is made of an organic material layer, has an opening formed in a part thereof in the portion where the sealing material SL is formed. The opening is formed along the longitudinal direction of the sealing material SL.

In the case where the opening is formed in this manner, a sufficient amount of UV light for curing the sealing material SL can be obtained from both the transparent substrate SUB1 and the transparent substrate SUB2.

Embodiment 13

Figure 18:
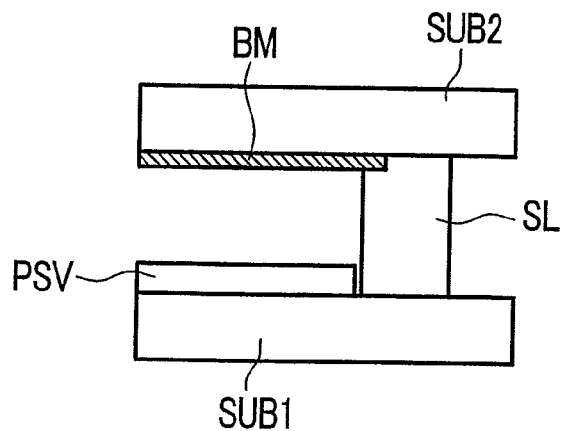
FIG. 18 is a diagrammatic cross-sectional view showing another embodiment of the liquid crystal display device according to the invention.

FIG. 18 is a cross-sectional view showing the construction of another embodiment of the liquid crystal display device according to the invention, and it corresponds to FIG. 17.

As compared with Embodiment 12 shown in FIG. 17, Embodiment 13 has a different construction in that the extended end of the protective film PSV is located at a position which is not beyond the sealing material SL.

Embodiment 14

Figure 19:
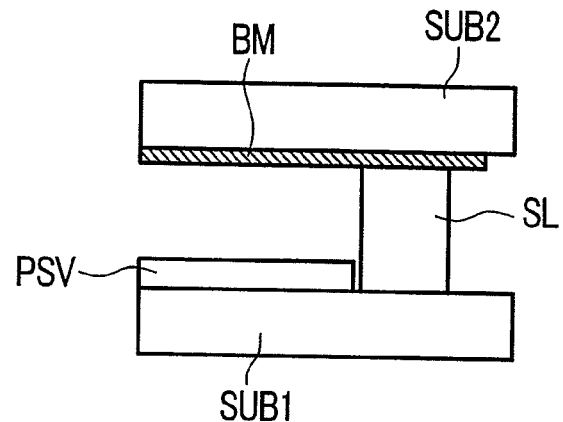
FIG. 19 is a diagrammatic cross-sectional view showing another embodiment of the liquid crystal display device according to the invention.

FIG. 19 is a cross-sectional view showing the construction of another embodiment of the liquid crystal display device according to the invention, and it corresponds to FIG. 18.

As compared with Embodiment 13 shown in FIG. 18, Embodiment 14 has a different construction in that the extended end of the black matrix BM is located beyond the sealing material SL.

In this case, irradiation with only UV light from the transparent substrate SUB1 contributes to the curing of the sealing material SL.

Embodiment 15

Figure 20:
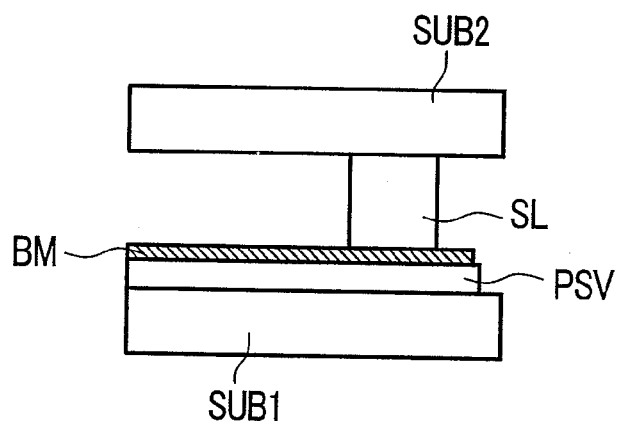
FIG. 20 is a diagrammatic cross-sectional view showing another embodiment of the liquid crystal display device according to the invention.

FIG. 20 is a cross-sectional view showing the construction of another embodiment of the liquid crystal display device according to the invention, and it corresponds to FIG. 16.

As compared with Embodiment 11 shown in FIG. 16, Embodiment 15 has a different construction in that the protective film PSV and the black matrix BM are formed on the transparent substrate SUB1, and the extended ends of the protective film PSV and the black matrix BM are located beyond the sealing material SL.

In this case, irradiation with only UV light from the transparent substrate SUB2 contributes to the curing of the sealing material SL.

Embodiment 16

Figure 21:
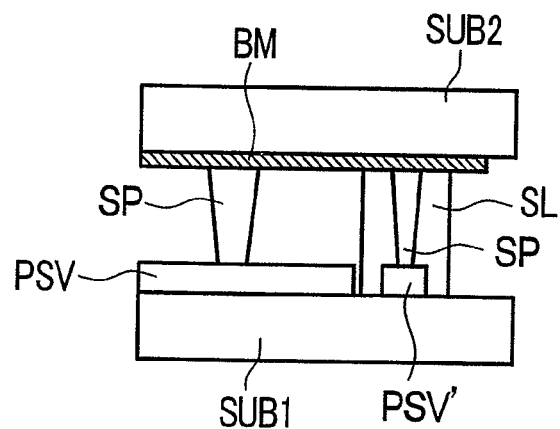
FIG. 21 is a diagrammatic plan view showing another embodiment of the liquid crystal display device according to the invention.

FIG. 21 is a cross-sectional view showing the construction of another embodiment of the liquid crystal display device according to the invention, and it corresponds to FIG. 19.

As compared with Embodiment 15 shown in FIG. 19, Embodiment 16 has a different construction in that a spacer SP is formed in the sealing material SL, and this spacer SP is formed similarly to the column-shaped spacer SP formed in the liquid crystal display part AR on the transparent substrate SUB2.

In this case, since the protective film PSV is formed on the transparent substrate SUB1 in the liquid crystal display part AR, an organic material layer PSV', which is made of the same material as the protective film PSV, is formed in the sealing material SL and is constructed so that the head of the spacer SP is opposed to the organic material layer PSV'.

Accordingly, the gap between the transparent substrates SUB1 and SUB2 in the area in which the sealing material SL is formed becomes equal to that in the liquid crystal display part AR.

Embodiment 17

Figure 22:
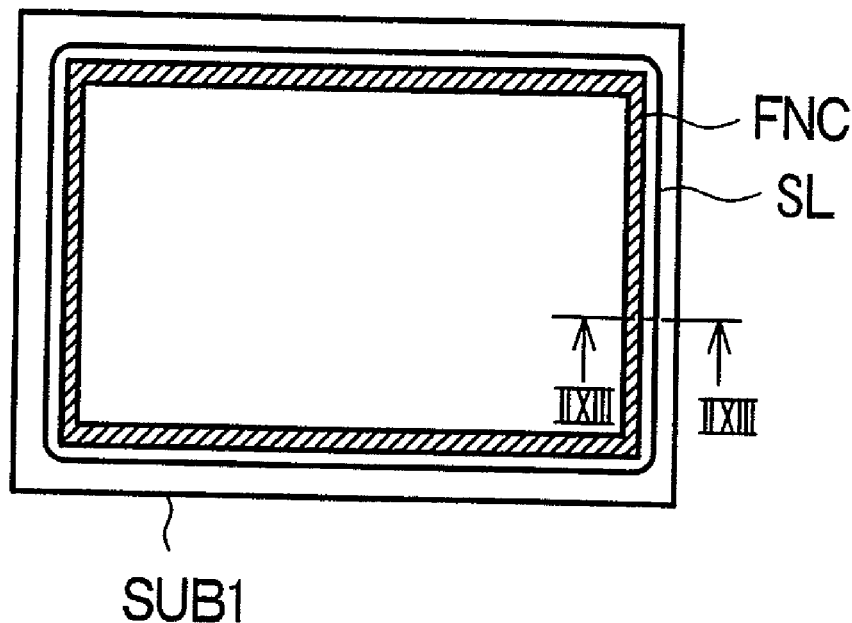
FIG. 22 is a plan view showing another embodiment of the liquid crystal display device according to the invention.

Embodiment 17 is based on the construction of Embodiment 11, and, as shown in FIG. 22, a fence FNC, which has the shape of a rectangular frame disposed approximately in parallel with the sealing material SL, is provided inside the sealing material SL.

Figure 23:
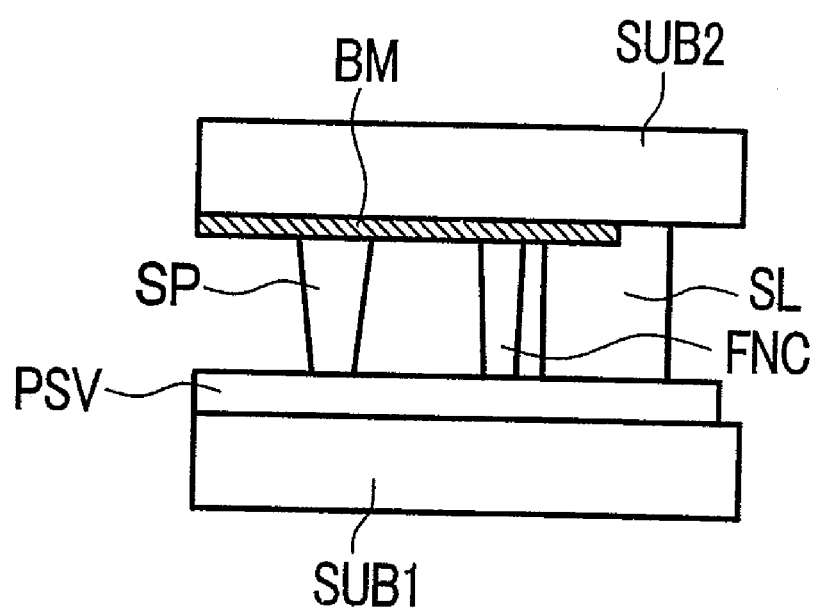
FIG. 23 is a cross-sectional view taken along line IIXIII-IIXIII of FIG. 22.

FIG. 23 is a cross-sectional view taken along line IIXIII-IIXIII of FIG. 22. The fence FNC is formed similarly to the column-shaped spacer SP formed in the liquid crystal display part AR. The fence FNC is formed for the purpose of, for example, preventing contaminants which affect the liquid crystal material from penetrating the liquid crystal material from an uncured portion of the sealing material SL.

Embodiment 18

Figure 24:
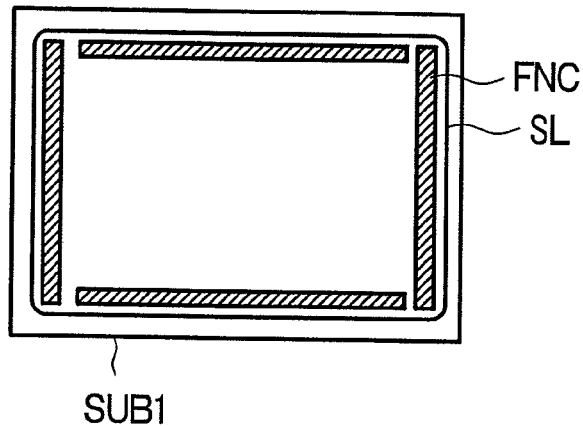
FIG. 24 is a plan view showing another embodiment of the liquid crystal display device according to the invention.

FIG. 24 is a plan view showing another embodiment of the liquid crystal display device according to the invention, and it corresponds to FIG. 22.

As compared with Embodiment 17 shown in FIG. 22, Embodiment 18 has a different construction in that the fence FNC includes separately divided portions so that a plurality of fences FNC are physically formed to achieve an advantage similar to that of Embodiment 17.

Embodiment 19

Figure 25:
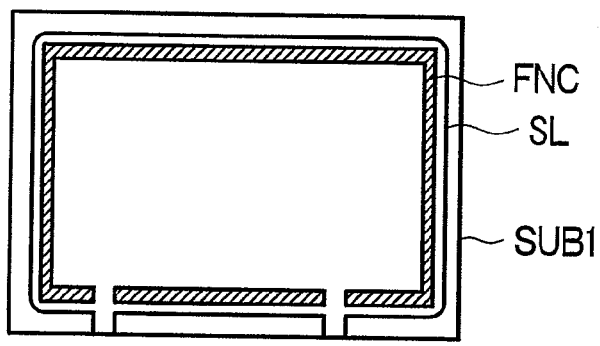
FIG. 25 is a plan view showing another embodiment of the liquid crystal display device according to the invention.

FIG. 25 is a plan view showing another embodiment of the liquid crystal display device according to the invention, and it corresponds to FIG. 22.

As compared with Embodiment 17 shown in FIG. 22, Embodiment 19 has a different construction in that sealing portions through which excess liquid crystal is discharged, or sealing portions through which bubbles are discharged, are formed in a portion of the sealing material SL, and openings are provided in the fence FNC at portions opposed to the sealing portions.

Embodiment 20

Figure 26:
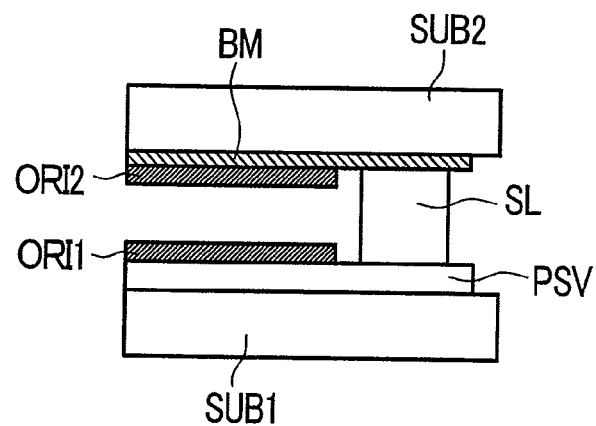
FIG. 26 is a diagrammatic cross-sectional view showing another embodiment of the liquid crystal display device according to the invention.

Embodiment 20, as shown in FIG. 26, is based on the construction of Embodiment 11, and in the case where a photocuring resin is formed as the sealing material SL, the alignment films ORI1 and ORI2 formed on the liquid-crystal-side surfaces of the respective transparent substrates SUB1 and SUB2 are extended to a location which is not beyond the sealing material SL, so that their respective extended ends are disposed out of contact with the sealing material SL.

This is done because it is necessary to avoid the problem that ionic contaminants, which easily occur from the sealing material SL, are easily diffused into the liquid crystal material through the alignment films.

Incidentally, it goes without saying that the construction of Embodiment 20 can be applied to any of the previously-described embodiments.

As is apparent from the foregoing description, in accordance with the liquid crystal display device according to the present invention, it is possible to prevent the uncuring of a liquid crystal sealing material or a sealing material which causes display irregularity.

What is claimed is:

1. A liquid crystal display device comprising:
a pair of substrates disposed in opposition to one another with a liquid crystal interposed therebetween;
active elements formed on one of the pair of substrates;
an organic film layer formed to cover the active elements;
a light-shielding film formed on another of the pair of substrates; and
a sealing material which sticks the pair of substrates together;
wherein the sealing material is integrally formed along the entire periphery of a screen;
wherein one of the light-shielding layer and the organic film layer is formed to be extended beyond an area where the sealing material is formed, and the other is formed inside the area where the sealing material is formed; and
wherein the sealing material has therein a spacer formed on one of the pair of substrates, and the organic film layer is formed to be opposed to the spacer and to be spaced apart from an organic film layer formed in another area.

2. A liquid crystal display device according to claim 1, wherein the sealing material has photocuring properties.

3. A liquid crystal display device according to claim 1, wherein the light-shielding layer is formed inside the area where the sealing material is formed.

4. A liquid crystal display device according to claim 1, wherein the liquid crystal is formed by a drop method.

\* \* \* \* \*